Patented Mar. 21, 1950

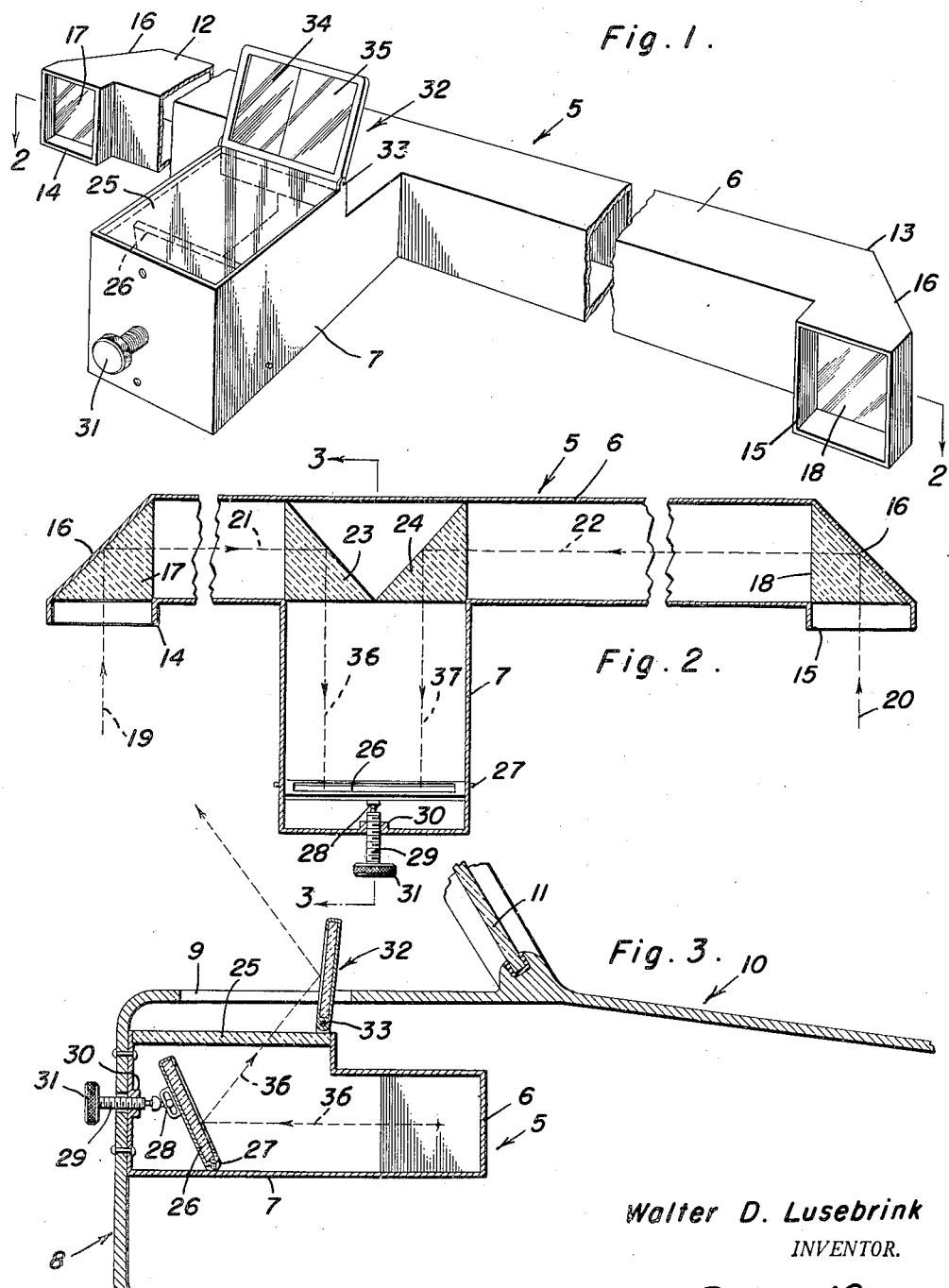

2,501,067

UNITED STATES PATENT OFFICE 2,501,067

REARVIEW MIRROR WITH IMAGE PROJECTING PERISCOPICAL FACILITIES

Walter D. Lusebrink, Detroit, Mich.

Application July 30, 1948, Serial No. 41,506

2 Claims. (Cl. 88—70)

This invention relates to vehicle type rear view mirrors, generally speaking, and has reference, more specifically, to novel and improved right and left periscopical means and an arrangement of complemental reflecting mirrors effectively co-ordinated with each other and said means to provide adequate and reliable viewing of vehicular traffic conditions rearwardly of the driver of the vehicle, whereby to promote safe and efficient driving.

As is evident from the foregoing general statement of the invention, periscopic rear view pick-up devices have been used by others in order to find and gather in a view of the rearward traffic panorama. Also, it is broadly old to locate a twin periscope at eye level on an automobile and to utilize the images of objects by projecting same on a rear view reflecting mirror. Thus, with the field of invention so developed, I aim, as a newcomer to same, to structurally, functionally and otherwise improve upon prior art adaptations and, in so doing, to provide a distinct contribution to this line of endeavor.

Briefly, I achieve my principal aims by providing a horizontal tube, in the open lateral ends of which I mount primary right angle prisms focused to accommodate the expected range of trailing traffic conditions. At the central portion of the tube are complemental right angle secondary prisms properly lined up to co-ordinate with the first named prisms, the two sets of prisms, thus paired, serving to collectively pick up and to ultimately transfer images of objectives to collateral reflecting mirrors, one of the latter being the stated rear view mirror.

It is an object of the invention to provide the above briefly described invention, wherein the two reflecting mirrors are on different planes and are adjustable one to the other.

A further object is to locate the principal rear view mirror on a plane about even with the eyes of the driver so that it may be almost constantly referred to without having to strain and twist one's neck while simultaneously raising and lowering the head and unwittingly inviting accidents as the eyes leave the road.

Another object of the invention is to divide the rear view mirror into right and left fields of vision and to "channel" the incoming image beams so that they are properly received in proper fields on said mirror.

In addition to the above, it is a worthy object of the invention to provide a structure devised in accordance with the preceding brief description wherein four 45° angle prisms are arranged in longitudinal and properly spaced order, the first named or primary prisms serving to plug and thus close the rearwardly directed view intake ends of the prism tube, thus closing said tube and avoiding the presence of an open duct which would collect dust and dirt and ruinous amounts of moisture, only to ruin the efficiency of operation of the over all structure.

More specifically, it is an object of the invention to incorporate the stated tube as part of a substantially T-shaped casing, the short branch of said casing being rearwardly directed at instrument board level and this being the part which properly mounts the two adjustable reflecting mirrors.

Other objects and advantages will become more readily apparent from the following description and the accompanying illustrative drawings.

In the drawings, wherein like numerals are employed to designate like parts throughout the views:

Figure 1 is a fragmentary perspective view illustrating an improved rear view mirror arrangement with accompanying periscopical image take-up, projecting and final reflecting facilities, Figure 2 is a horizontal section taken on the horizontal line 2—2 of Figure 1, looking in the direction of the arrows, and Figure 3 is a section at right angles, this being on the line 3—3 of Figure 2, looking in the direction of the arrows.

Referring now to the drawings by distinguishing reference numerals and complemental lead lines the numeral 5 designates, as a unitary structure, a substantially T-shaped sheet metal or equivalent casing. Said casing is thus made up of branches which may be conveniently referred to as tubes 6 and 7 respectively, said tubes being substantially rectangular in cross section, the cross sectional dimension of the tube 7 being approximately twice that of the longer tube 6. In practice, the entire casing unit is adapted to be suitably suspended beneath and attached to appropriate portions of the instrument panel construction 8. Incidentally, the numeral 9 designates an accommodation opening which is provided in the horizontal part of the structure 8, the numeral 10 designates a windshield cowl and 11 the usual windshield. In practice, the outer end portions of the tube 6, the ends 12 and 13 project through a suitable opening provided therefor in the side walls of the automobile or other vehicle equipped with the invention. The rearwardly directed view intake ends are denoted by the numerals 14 at the left and 15 at the right. The portions 16 at opposite ends are oblique to the longitudinal axis of the tube proper and serve to back up and accommodate right angle type lenses or prisms 17 and 18. I prefer to use 45° angle crystal clear prisms and these are so mounted on the end portions 16 and arranged in respect to the intakes 14 and 15 that they thus serve to "plug" and close what would otherwise be open ends.

It is obvious that the stated prisms 17 and 18 are focused on objectives within a reasonable field of view and properly arranged, suitable for effectively indicating trailing vehicular traffic conditions. As a matter of fact, these prisms serve as primary pick-up lenses and objects and objectives in the rear, forming the panorama trailing the moving vehicle, and in use, register with the lines of projections 19 and 20. The incoming projection lines are conditioned to traverse the portions of the tube between the stated lenses or prisms 17 and 18 where they take the approximate courses indicated at 21 and 22 and are interrupted by and turned at right angles by way of the complemental secondary prisms 23 and 24. These prisms are in abutting relationship and are lined up with the double width branch or tube 7. This tube resembles more a box and is open at its top where it is provided with a clear piece of glass, serving as a window or closure 25. Beneath the window and in the box is a suitable rectangular reflecting mirror 26 hingedly mounted in place as at 27 and having adjustable connection as at 28 with an adjusting screw 29. The latter is operatively mounted in a nut as at 30 and is provided with a knurled finger grip 31. This makes it possible for the driver of the car to conveniently reach out and make an adjustment to regulate the angularity of the reflecting mirror 26 in relation to the rear view or final reflecting mirror 32. The latter is hingedly mounted atop the box-like portion of the casing as shown at 33. Any suitable adjusting and fixing means (not shown) may be provided to take care of this particular mirror. It will be noted that the rear view mirror is divided into two frames or left and right fields 34 and 35 as shown in Figure 1. Moreover the projected light rays 19, 20, 21, and 22 (left to right in Figure 2) take the proper courses and are finally projected along lines 36 and 37 in reflective screen-like fashion on the rear view mirror into the correct fields 34 or 35, as the case may be.

The invention virtually takes a snap shot, as it were, of the vehicle panorama within a satisfactory range trailing the vehicle, whereby observations are readily made and tell-tale results are reflected on the rear view mirror. The device is an instrumentality of a satisfactory type for determining the distance and relative positions of objects, usually those representing pedestrian and vehicular traffic conditions. It operates efficiently within an acceptable range and its scope of performance is excellent. In fact, it appears to represent the nearest possible approach to effective accomplishments in the field of endeavor under advisement. In the construction shown we have an adequate and dependable structural adaptation with properly situated and housed prisms admitting light rays through the exteriorly located apertures by way of which images of the objectives are projected and finally thrown for review on a simple rear view reflecting mirror, the latter in a plane which is approximately even with the line of vision of the driver of the car.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

1. In a rear view mirror of a twin periscopical type, a periscopic unit comprising an elongated tube having rearwardly directed opposite end portions adapted for disposition exteriorly of the sides of an automobile, two 45° prisms, one prism lodged in each end of the tube and completely closing and sealing said end to the passage of air, dust, insects and rain water, a pair of additional 45° prisms lodged in the intermediate portion of said tube, a second tube in a plane with and at right angles to the first tube and lined up with the last named prisms, and reflecting mirrors adjustably mounted on said second tube, one mirror being within the latter tube and angularly adjustable in relation to said tube and aligned prisms, and the remaining mirror facing rearwardly and being outside of and atop said tube and in reflective alignment with the first named mirror and having right and left hand fields of vision.

2. In a rear view mirror of a twin periscopical type, a periscopic unit comprising an elongated tube having rearwardly directed opposite end portions adapted for disposition exteriorly of the sides of an automobile, two 45° prisms, one prism lodged in each end of the tube and completely closing and sealing said end to the passage of air, dust, insects and rain water, a pair of additional 45° prisms lodged in the intermediate portion of said tube, a second complemental rectangular tube in a plane with and at right angles to the first named tube and lined up with the additional prisms, said second tube being open at the end adjacent said additional prisms and having its top provided with an opening, a glass panel closing said opening, a mirror angularly adjustable in said second tube, a thumb screw carried by said tube and operatively connected with the mirror for angling and adjusting same in relation to the overlying glass panel, and a second rear view mirror mounted exteriorly of the second tube and lined up with the first named mirror and glass panel, said second rear view mirror being provided with left hand and right hand fields of vision lined up with the objectives and images channeled thereto by way of the respective right and left sets of prisms.

WALTER D. LUSEBRINK.

REFERENCES CITED

The following references are of record in the file of this patent:

UNITED STATES PATENTS

| Number | Name | Date |
| --- | --- | --- |
| 951,755 | Crane | Mar. 8, 1910 |
| 1,649,083 | Ruth | Nov. 15, 1927 |
| 1,745,862 | O'Rourke | Feb. 4, 1930 |
| 1,977,019 | Smith | Oct. 10, 1934 |
| 2,193,217 | Allen | Mar. 12, 1940 |
| 2,221,449 | Hoeninghausen | Nov. 12, 1940 |
| 2,281,102 | Lowman | Apr. 28, 1942 |

FOREIGN PATENTS

| Number | Country | Date |
| --- | --- | --- |
| 450,057 | Germany | July 24, 1926 |
| 558,481 | Great Britain | Jan. 6, 1944 |